United States Patent [19]

Snopko

[11] 3,932,700

[45] Jan. 13, 1976

[54] FOCUS TRACKING REGISTRATION FOR OPTICAL REPRODUCING SYSTEMS

[75] Inventor: Paul A. Snopko, Chicago, Ill.

[73] Assignee: Zenith Radio Corporation, Chicago, Ill.

[22] Filed: Feb. 4, 1974

[21] Appl. No.: 439,657

[52] U.S. Cl. .................. 178/6.6 R; 179/100.3 V; 179/100.4 R; 250/201; 250/578
[51] Int. Cl.² ............... H04N 5/76; G11B 11/18
[58] Field of Search ............ 179/100.3 V, 100.3 B, 100.4 R, 179/100.4 A; 250/201, 208, 211 R, 578; 178/6.7 A, 6.7 R, 6.6 A, 6.6 R

[56] References Cited
UNITED STATES PATENTS

| | | | |
|---|---|---|---|
| 3,198,880 | 8/1965 | Toulon | 179/100.3 V |
| 3,553,455 | 1/1971 | Sato et al. | 250/208 |
| 3,610,934 | 10/1971 | Turner | 250/201 |
| 3,673,412 | 6/1972 | Olson | 179/100.3 B |
| 3,848,095 | 11/1974 | Wohlmut | 179/100.3 V |

Primary Examiner—Bernard Konick
Assistant Examiner—Jay P. Lucas
Attorney, Agent, or Firm—Cornelius J. O'Connor

[57] ABSTRACT

A video disc reproducing system wobbles the reading beam across the storage track of the disc and the outputs of two photocells are added to develop both the information signal and a radial beam tracking signal employed to maintain tracking registration of the beam and the storage track. The outputs of these cells are also combined differentially to develop a focus tracking signal used to adjust the focal plane of the reading beam to maintain focus registration.

A search feature adjusts the focus conditions over a range but is disabled and is superseded by the focus tracking control arrangement once focus conditions are brought within the operating range of the focus tracking arrangement.

8 Claims, 7 Drawing Figures

FOCUS TRACKING REGISTRATION FOR OPTICAL REPRODUCING SYSTEMS

RELATED PATENT APPLICATIONS

This application is related to concurrently filed applications Ser. Nos. 439,683 — Adler, 439,682 — Whitman, and 439,681 — Watson. The Adler application is incorporated herein by reference. It discloses and claims an improved type of radial beam tracking arrangement featuring wobbulation of the reading beam and is extended by the subject invention to concurrently achieve focus tracking. The Whitman and Watson applications disclose undulations provided in the storage track of a video disc as an alternative implementation of the Adler radial tracking concept, utilizing a particular storage track configuration in place of wobbulation of the reading beam.

SUMMARY OF THE INVENTION

The Adler application, with respect to which the present invention is a further development, is a novel radial tracking arrangement for optical image reproducing systems. It has general application to the various types of video discs presently known including those in which the information is stored by the technique of pits and intervening lands, by mechanically cut V-shaped grooves or by photographic techniques with incremental track areas of variable transmissivity. Of particular interest is the disc in which the record track includes pits and lands of a uniform width but with variable longitudinal dimension to represent the temporal variations of a frequency-modulated signal employed in producing a master of which the record to be read is a mechanical replication. Desired information may comprise a video program having luminance, chroma, audio and synchronizing signals stored in a spiral track each convolute of which represents the two image fields and timing data characteristic of double interlaced video transmission employed in commercial television broadcasts.

The pit element of the storage track may have a depth representing one-quarter wavelength of the reading beam in the medium of the disc or, alternatively, a depth of one-half wavelength. These differences have significant bearing on the type image reproducer that is employed, especially as to the servo arrangement necessary to achieve such controls as radial beam tracking. Radial tracking for discs with half wavelength pits required, prior to the Adler improvement, complicated arrangements of the two tracking beams focused on opposite sides of the storage track and provided with independent photoreceptors from which a radial tracking correction signal could be developed. The Adler teaching simplified matters by obviating the need of extra radial tracking beams. While the present invention is useful with a variety of video discs it, too, is especially suited to the half wave pit storage track and, for convenience, will be described in that connection.

It is an object of the invention to provide a novel focus tracking arrangement for an optical image reproducing system.

It is another and particular object of the invention to attain focus tracking for an optical image reproducer wherein radial beam tracking is accomplished through the technique of wobbling the reading beam relative to the storage track.

Accordingly, the invention is directed to an optical system having an information signal stored in a track on a carrier to be derived by reading of the storage track with a focused beam of energy. A periodic lateral relative displacement of the beam with respect to the track is effected at a predetermined wobble frequency to develop a radial tracking error in response to which radial tracking registration is maintained. The subject invention improves a system of this type by contributing a focus tracking arrangement having a pair of photoreceptors, which may also serve for radial tracking, disposed on opposite sides of a reference plane that includes the optical axis of the reading beam during radial tracking registration of the tangent of the storage track. There are means for obtaining from the output signals of those photoreceptors during operating intervals in which the beam and carrier are out of focus registration, a focus signal of the wobble frequency having a phase related to the sense of focus misregistration and a magnitude related to the extent of misregistration. The arrangement further includes a synchronous detector and means for supplying to it the focus error signal as well as a reference signal phase synchronized to the wobbulation of the reading beam to develop a focus tracking signal. Additionally, there are means responsive to the focus tracking signal for maintaining focus registration.

It is known that video discs of the type under consideration may be transmissive or reflective and again, for convenience, the transmissive mode will be described in detail even though the invention has equal application to operation in the reflective mode.

DESCRIPTION OF THE PREFERRED EMBODIMENTS

Figure 1:
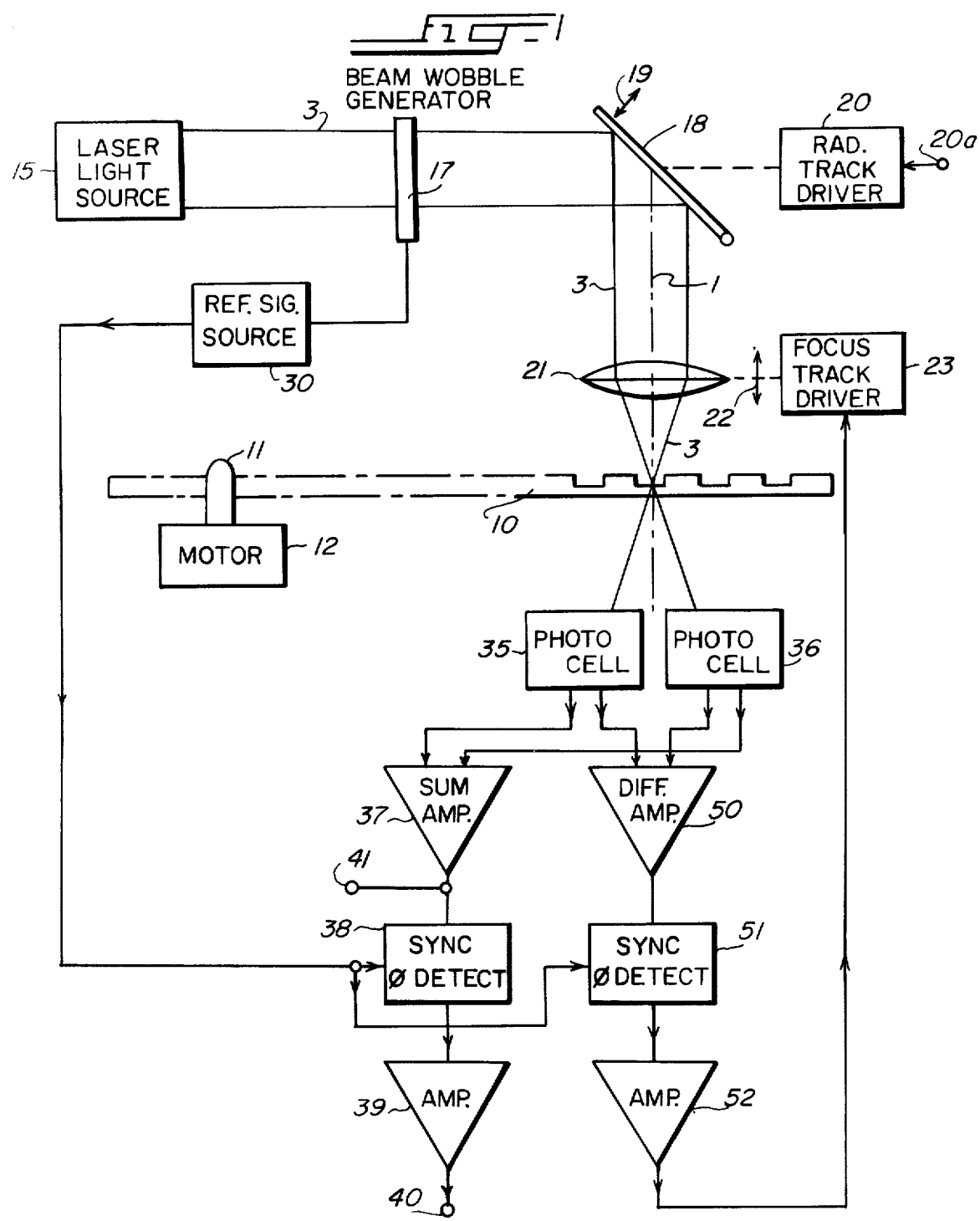
FIG. 1 is a schematic representation of a transmissive mode optical image reproducing system embodying the radial beam tracking arrangement of the Adler application as well as focus tracking in accordance with the subject invention.

Referring now more particularly to FIG. 1, the optical image reproducing system there represented schematically features the use of a laser beam to read information stored on a transparent video disc 10 of plastic material, such as polyvinyl chloride, having a storage track in the form of a multiturn spiral recording information to be derived by reading the track with a reading beam of energy. The disc is shown in partial radial cross section for rotation on a spindle 11 driven by a motor 12. Where the disc is formed of sufficient thickness to be rigid, like an audio record, it may be supported on a turntable (not shown) for rotation at an appropriate speed. For some uses there is a distinct preference that the disc be sufficiently thin, of the order of 6 mils, to be flexible in which case it is supported and held at a centrally located aperture for rotation at a high speed in a technique known as flying the disc. Both methods of support are known and both are useful in systems embodying the present invention. For the sake of specifity, it will be assumed that disc 10 is not only transmissive but has been prepared as a replica of a master recording of an angular-velocity (frequency) modulated carrier signal modulated in accordance with program information comprising luminance, chroma and audio components as well as timing or synchronizing components. Each convolute of the record track represents two interlaced fields of an image and their associated timing information. The temporal variations of the recorded carrier signal take the form of a succession of pits and lands of a common uniform width but variable in longitudinal dimension, alternating along the record track. The pit dimension will be assumed to be one-half wavelength of the reading beam in the medium of the record.

Disc 10 is read by a beam produced by a light source 15, such as a helium neon laser, which forms a collimated beam 3 directed along an optical path including a beam wobbling device 17. As explained in the Adler application, it is desirable that the wobble frequency be high in comparison with the frequency range necessary for effective servo operation; illustratively a wobble frequency of 100–200 KHz is suitable.

One attraction of the Adler radial tracking arrangement is its simplicity and inexpensiveness particularly since an acousto-optic element may be used to accomplish beam wobbulation. The Adler application describes both a longitudinal mode and a flexural mode acousto-optic element formed of a glass block to which may be attached one or more piezoelectric elements, poled and excited to drive the glass block at its natural resonant frequency. In response to such excitation, a beam traversing the block encounters an index of refraction which changes in each half cycle of the resonance to deflect the beam in one direction and then in the opposite direction a sufficient amount to accomplish the desired lateral displacement of the reading beam. Usually, it is sufficient to displace the beam in an amount corresponding to its cross sectional dimension. Excitation of acousto-optic element 17 is under the control of a reference oscillator 30 which is tuned approximately to the natural resonance to be established in the vibrator.

The beam emerging from element 17 is reflected by a mirror 18 that is displaceable, as indicated by an arrow 19, under the control of a radial tracking driver 20. Preferably, mirror 18 and its driver 20 are constructed in accordance with the Adler et al. application, Ser. No. 439,684, filed Feb. 4, 1974, in which case it is a cantilever mounted piezoelectric bender or bimorph carrying mirror 18 at its free end for displacement in accordance with the polarity and intensity of an applied radial tracking signal.

Mirror 18 directs the reading beam to an objective or focus lens 21 which focuses beam 3 on the storage track of disc 10. The present invention has to do with focus tracking which may be accomplished by adjusting the position of the focal plane or the video disc; as shown, it is contemplated that objective 21 is mounted for movement along the optical axis of the optical system, being displaceable as indicated by arrow 22 under the control of a focus tracking driver 23. That driver constitutes means for controlling the position or movement of lens 21 along the optical path in response to a focus tracking signal to be considered more particularly hereafter.

Light emerging from disc 10, modulated in accordance with the stored information, is received by a pair of photoreceptors 35, 36 disposed on opposite sides of a reference plane 1 that coincides with the optical axis of the reading beam during conditions of radial tracking registration. Also at such times the reference plane includes the longitudinal axis of the segment of the record track instantaneously being read. The outputs of these photoreceptors are variously used to obtain error signals for controlling radial beam tracking in accordance with the Adler concept on the one hand and for controlling focus tracking in practicing the present invention.

Radial tracking relies on the property that a video disc having half wave pits effects symmetrical scattering or diffraction of the light of the reading beam whenever that beam at least partially enters such a pit. The extent of scattering is dependent on the amount of the beam entering the pit so that maximum scattering occurs in instants of radial beam tracking registration. It may be shown, as explained in the Adler application, that conditions of radial misregistration of the beam relative to the track manifest phase modulation of that output component of each photoreceptor occurring at the wobble frequency. The phase of the modulation is related to the sense of radial misregistration and the magnitude of modulation reflects the degree of misregistration. Synchronous detection of the wobble-frequency component in a synchronous detector that is phase synchronized with the displacement of the beam develops a radial beam tracking signal appropriate for application to driver 20 to establish and maintain radial tracking registration. To that end, and since two photoreceptors are required for focus tracking, the outputs of cells 35 and 36 are applied to a summing amplifier 37 and its output is delivered to a first synchronous detector 38 to which an appropriate phase reference signal from source 30 is also applied. The detected output after amplification and phase compensation in an amplifier 39 is delivered to an output terminal 40 which may be connected to input terminal 20a of radial tracking driver 20 to energize that driver and occasion controlled displacement of mirror 18 to maintain radial tracking registration. Of course, the output of amplifier 37 also includes a carrier component which is frequency modulated and is a replica of the frequency-modulated signal with which the record has been made. That signal may be derived at output terminal 41 for application to a utilizing device. If that device is a home television receiver, as is usually the case, terminal 41 may lead to a transcoder (not shown) which converts the signal derived from reading video disc 10 into a modulated carrier signal appropriate for application to the antenna terminals of the color receiver. As thus far described, the arrangement of FIG. 1 is essentially the same as that described and claimed in the Adler application, differing essentially only in the fact that two photoreceptors 35, 36 are shown, whereas only one is required for radial tracking purposes.

Focus tracking is obtained, in accordance with the subject invention, by combining the outputs of photoreceptors 35, 36 in a differential amplifier 50 to develop, during operating intervals in which the beam and disc 10 are out of focus registration, a focus error signal of the wobble frequency having a phase related to the sense of focus misregistration and a magnitude related to the extent of misregistration. Again, operating upon that signal in a second synchronous detector 51 develops a focus tracking signal delivered through an amplifier 52 to the focus tracking driver 23. Detector 51 also requires a phase reference which is supplied by the same source 30. Of course, phase compensation and filtering of the focus tracking signal may be included within unit 52.

Figure 2:
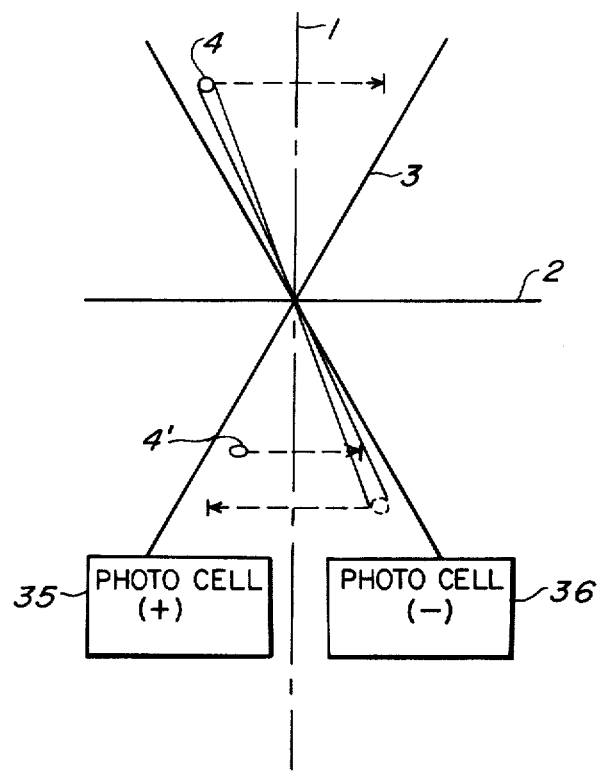
FIGS. 2 and 3a–3c are sketches employed in describing the operation of focus tracking.

The operation of the focus tracking arrangement will be understood quite readily from a discussion of the sketch of FIG. 2 showing a reading beam focused in a plane 2 and exciting photocells 35, 36 symmetrically disposed relative to reference plane 1. The usual convention has been adopted to represent a cone-shaped reading beam 3. If an object 4 is disposed within the beam to the left of reference plane 1 it casts a shadow, as indicated by the construction lines, in the field of photoreceptor 36 and, if the sum and minus designations shown in the sketch are adopted, the condition under consideration is one wherein the output of the (+) cell 35 exceeds that of (−) cell 36. On the other hand if object 4 were to be located to the other side of reference plane 1, as shown by the broken-line arrow, the converse conditions are established with the output of (+) cell 35 less than that of (−) cell 36. It will be observed that these conditions exist where the object is above focal plane 2.

Now consider the case where an object 4' is located within the beam but below focal plane 2 and to the left of reference plane 1. It decreases the output of cell 35 relative to cell 36. If it is shifted to the other side of reference plane 1, again as indicated by the broken-line arrow, the output of cell 36 is decreased relative to cell 35. In short, out of focus conditions for objects above and below focal plane 2 produce opposing changes in the outputs of the two photocells, that is to say, the phase of the change in signal output indicates the sense in which the object is out of focus.

Figure 3A:
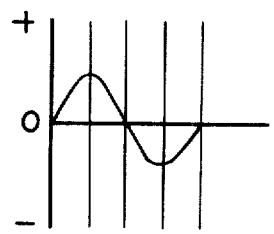
Figure 3B:
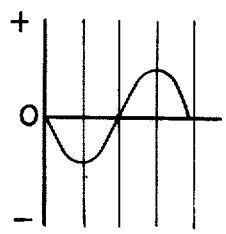

This may be viewed a little differently in the manner represented by the curves of FIGS. 3a and 3b. The curve of FIG. 3a shows the signal obtained by differentially combining the outputs of the photocells if it be assumed that an object 4 is moved in a plane above focal plane 2 from a position just to the left of the beam, through the beam, and then just beyond it to the right. While the object is within the left half of the reading beam the output of cell 35 predominates and the differential output is positive but the output of cell 36 dominates when the object is within the beam and into the right of reference plane 1, contributing the negative half of the curve. The curve of FIG. 3b shows the signal derived where the object 4' is introduced into and disposed through the reading beam from left to right in a plane beneath focal plane 2. Comparison of the curves of these two figures shows them to be of opposite phase. Accordingly, detection in a synchronous detector under the control of a proper phase synchronized reference signal develops a focus tracking signal of appropriate polarity and amplitude for application to a focus tracking driver.

An analogous operation takes place in the focus tracking arrangement included in FIG. 1. More particularly, the described movement of object 4 or 4' in developing the signals represented by the curves of FIGS. 3a and 3b is essentially the same as the movement of reading beam 3 under the control of acousto-optic element 17 except that the reading beam displacement is cyclical, occurring at the wobble frequency. Under conditions of focus misregistration, even if radial tracking registration be assumed, there is a scattering or diffraction of the light beam as it scans the record track which develops in detector 51 focus tracking signals in accordance with the curves of FIG. 3a or 3b, depending upon the sense or direction of misregistration. Driver 23 responds to that signal to establish and maintain focus tracking registration.

Figure 3C:
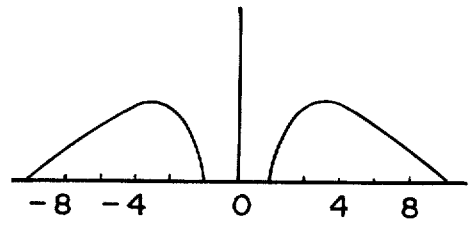

The amplitude of the focus tracking signal varies with the extent of defocus in the manner indicated by the curve of FIG. 3c wherein positive values of the abscissa designate distance above focal plane 2 while negative values show distance below the focal plane. The unit of the scale is microns because in the usual video disc the storage track width is approximately one micron and the diameter of the focused reading beam is nearly the same. Due to the shape of the focused beam, there is a region or depth of focus indicated by the zero value of the curve of FIG. 3 immediately adjacent the origin. Since the focus tracking signal has a polarity related to the sense of focus misregistration, that signal may be employed to displace an element both sides of a reference to obtain focus registration.

Figure 4:
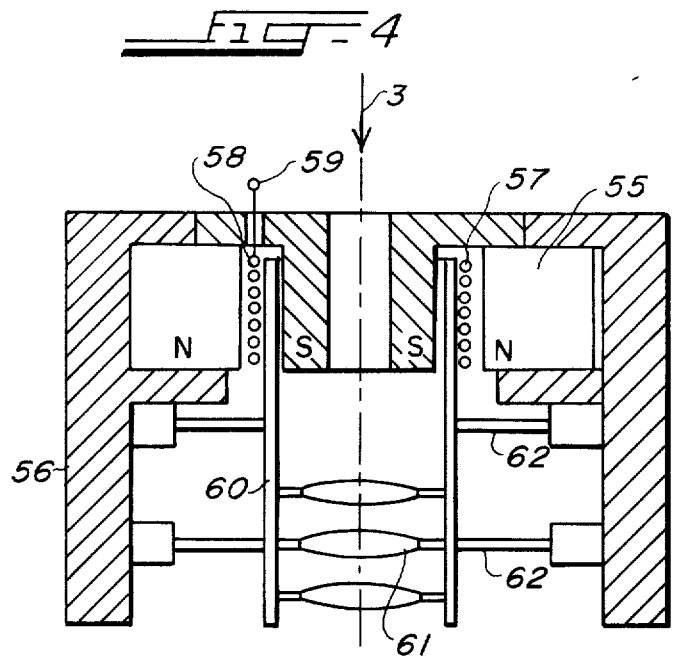
FIG. 4 is a representation of one form of device that may be utilized in controlling focus registration.

It is known, for example, that the portion of the disc exposed to the reading beam may be displaced relative to the focal plane to establish focus or, alternatively, an optical element may be controlled to adjust the location of the focal plane. For example, a flexible mirror having an adjustable curvature may be controlled for that purpose or a cantilever supported bimorph, having one surface prepared as a reflector, may be similarly used. Another arrangement, shown in FIG. 4, which suggests itself is a motor structure quite similar to that of a loudspeaker having a permanent magnet 55 supported within a magnetic structure 56. In the gap 57 there is the usual coil 58 having an input terminal 59 to which the focus tracking signal may be applied. The coil form 60 serves as a support for a lens system 61 and additionally resilient supports 62, 62 may be provided, holding the lens system for movement along the path or axis of reading beam 3. The position of the lens is adjustable in accordance with the polarity and magnitude of the signal applied to coil 58 in known fashion. No claim of invention is predicated on the structure of the movable element which is controlled to adjust focus registration. A number of such devices are well known in the art.

Figure 5:
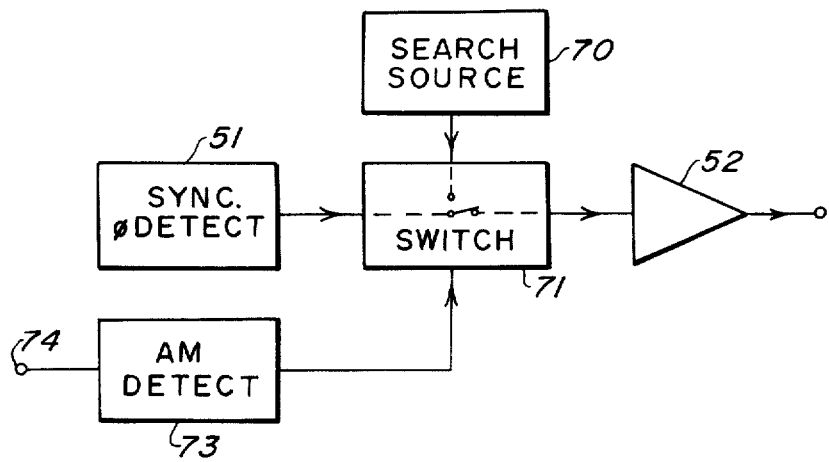
FIG. 5 is another embodiment of the invention featuring searching or sweeping to institute focus tracking.

The modification of the invention represented in FIG. 5 adds a focus search or sweep feature in which a source 70 may apply an alternating current signal through a switch 71 to focus tracking driver 23. With source 70 controlling the driver, the focus conditions vary over a wide range and switch 71 is arranged to disable the search feature and transfer focus adjustment to detector 51 when the condition of focus shall have been brought within the narrower pull-in range of the focus tracking arrangement. The switch 71 may normally couple source 70 to amplifier 52 and may respond to an applied control signal that exceeds a threshold level to switch source 70 out of functional connection with the focusing system and substitute detector 51 in its place. A suitable control may be exercised by an amplitude modulation detector 73 to the input terminal 74 of which the output of summing amplifier 37 is applied. When the focus conditions are close enough to establish at least a minimum RF output from photoreceptors 35, 36, the output of AM detector 73 will exceed the controlling or threshold level of switch 71 to enable detector 51 and its control of focus tracking.

While a particular embodiment of the present invention has been shown and described, it will be obvious to those skilled in the art that various changes and modifications may be made without departing from the inven-

What is claimed is:

1. In an optical reproducing system having an information signal stored in a track on a carrier to be derived by reading the storage track with a focused reading beam of energy, which system includes means for effecting periodic lateral relative displacement of said beam with respect to said track at a predetermined wobble frequency to develop a radial tracking error signal and means responsive to said radial error signal to maintain radial tracking registration of said track and said beam, the improvement which comprises a focus tracking arrangement having:
 a pair of photoreceptors disposed on opposite sides of a reference plane that includes (a) the optical axis of said reading beam during conditions of radial tracking registration and (b) the tangent of the storage track;
 means for differentially combining the output signals of said photoreceptors to develop, during operating intervals in which said beam and said carrier are out of focus registration, a focus error signal of said wobble frequency having a phase related to the sense of focus misregistration and magnitude related to the extent of misregistration;
 a synchronous phase detector;
 means for supplying to said detector said focus error signal and a reference signal phase synchronized to the periodic displacement of said beam to develop a focus tracking signal; and
 means responsive to said focus tracking signal for maintaining said beam and carrier in focus registration.

2. The improvement in accordance with claim 1 in which said storage track comprises pits having a depth of approximately one-half the wavelength of said reading beam in the medium of said carrier.

3. The improvement in accordance with claim 1:
 having a second synchronous phase detector; and
 means for applying the output of at least one of said photoreceptors and said reference phase signal to said second detector to concurrently develop a radial tracking signal.

4. The improvement in accordance with claim 3 in which the outputs of both of said photoreceptors are summed and applied to said second detector.

5. The improvement in accordance with claim 1 in which an objective lens, movable along the optical axis of said system, focuses said reading beam on said carrier and which said means for maintaining focus registration includes means for controllably moving said objective lens in response to said focus tracking signal.

6. The improvement in accordance with claim 1 in which said means for maintaining focus registration is effective to vary the condition of focus over a range and including a search signal source;
 a switch for selectively connecting the first-mentioned synchronous phase detector or said search signal source to said focus-registration means; and
 means for actuating said switch to connect said first-mentioned synchronous phase detector to said focus-registration means during operating intervals in which the condition of focus is within predetermined limits within said range.

7. The improvement in accordance with claim 6 in which said switch normally connects said search signal source to said focus-registration means.

8. The improvement in accordance with claim 6 in which said switch is responsive to an applied signal having a predetermined intensity to connect said first-mentioned synchronous phase detector to said focus-registration means and in which said means for actuating said switch comprises an amplitude modulation detector;
 means for applying the output of at least one of said photoreceptors to said amplitude modulation detector to develop a switch-operating signal; and
 means for applying said switch-operating signal to said switch.

* * * * *